United States Patent [19]

Gardner et al.

[11] Patent Number: 5,239,617
[45] Date of Patent: Aug. 24, 1993

[54] METHOD AND APPARATUS PROVIDING AN INTELLIGENT HELP EXPLANATION PARADIGM PARALLELING COMPUTER USER ACTIVITY

[75] Inventors: David L. Gardner, Longmont, Colo.; Donna M. Lamberti, Watertown; John M. Prager, Ashland, both of Mass.

[73] Assignee: International Business Machines Corporation, Armonk, N.Y.

[21] Appl. No.: 461,513

[22] Filed: Jan. 5, 1990

[51] Int. Cl.$^5$ ............................................. G06F 15/403
[52] U.S. Cl. ................................. 395/12; 364/419.08; 434/118; 395/934; 395/50
[58] Field of Search ........................ 364/513, 900, 419

[56] References Cited

U.S. PATENT DOCUMENTS

| | | | |
|---|---|---|---|
| 4,500,964 | 2/1985 | Nickle | 364/300 |
| 4,648,062 | 3/1987 | Johnson et al. | 364/900 |
| 4,713,775 | 12/1987 | Scott et al. | 364/513 |
| 4,736,296 | 4/1988 | Katayama et al. | 364/419 |
| 4,800,485 | 1/1989 | Ackroff et al. | 364/200 |
| 4,837,689 | 6/1989 | Tanaka et al. | 364/419 |
| 4,941,829 | 7/1990 | Estes et al. | 434/118 |
| 4,964,077 | 10/1990 | Eisen et al. | 364/900 |
| 4,965,741 | 10/1990 | Winchell et al. | 364/513 |
| 4,985,697 | 1/1991 | Boulton | 340/750 |

OTHER PUBLICATIONS

Erlandsen, "Intelligent Systems" Apr. 87, *J. of Information and Software Technology,* vol. 29, No. 3 pp. 115–121.
Imamiya, "Embedding Explanation Mechanism with User Interface", 1986, *SPIE Applications of AI,* vol. 635, pp. 650–657.
Winston, USP.
J. Marshall et al., "The intelligent help system: Linking a user to system knowledge", pp. 81–86, 1986, Conf. Rec., Link. Tech. and Users, Prof. Comm. Conf (Cat. No. 86CH2357-2), IEEE.
R. Wilensky, "Talking to UNIX in English; an overview of UC", Jun. 1984, Comm. of ACM, Jun. 1984, pp. 574–593.
R. Rubinoff, "Explaining concepts in expert systems: the CLEAR system", The Second Conf. on Art. Int. App., 1985, IEEE, pp. 416–421.
W. Lee, "'?': A context-sensitive help system based on Hypertext", 24th. ACM/IEEE Des. Auto. Conf. Proc. 1987, pp. 429–435.
R. Neches et al., "Enhanced maintenance and explanation of expert systems through explicit models of their development", IEEE Trans. on Software Engrg., 1985, pp. 1337–1351.
F. Hayes-Roth, "Rule-based systems", Comm. of ACM, Sep. 1985, pp. 921–932.
C. M. Yoder, "A Help System Which Provides Information in Varying Formats", 1986, IBM TR 01.A059.
C. M. Yoder, "An Expert System for Providing On--Line Information Based on Knowledge of Individual User Characteristics", 1986, Doctorial Thesis Syracuse University.
J. M. Carroll et al., "Learning By Doing With Simulated Intelligent Help", Comm. of ACM, Sep. 88, vol. 31, No. 9, pp. 1064–1079.
U. Wolz et al., "A Discourse Based Consultant for Interactive Environments", Mar. 88, Proc. IEEE AI Applications, pp. 28–33.
J. McKendree et al., "Advising Roles of a Computer Consultant", Apr. 86, ACM Chi. '86 Proceedings, pp. 35–40.

*Primary Examiner*—Allen R. MacDonald
*Assistant Examiner*—Roger S. Joyner
*Attorney, Agent, or Firm*—Doug McKechnie; P. R. Wadsworth; M. S. Block

[57] ABSTRACT

A data processing includes an on-line, interactive, intelligent help system which provides suggestions as to actions a user can take after entry into the system of an erroneous command or a question. The system also responds with explanations of why the suggestions were made and how they work. The system includes a natural language analyzer for converting the questions into goals. A knowledge base and an inference engine further analyze the goals and provide one or more suggestions on how to achieve such goals. An explanation generator uses such analysis to dynamically generate the explanations which are tailored to the user's goal.

8 Claims, 4 Drawing Sheets

METHOD AND APPARATUS PROVIDING AN INTELLIGENT HELP EXPLANATION PARADIGM PARALLELING COMPUTER USER ACTIVITY

FIELD OF THE INVENTION

This invention relates to the field of data processing. More particularly, the invention relates to improvements in intelligent, on-line, interactive help systems that provide computer users with suggestions and explanations, in response to the entry of questions or erroneous commands which parallel specific user activities.

BACKGROUND OF THE INVENTION

During the course of using a computer, a user may make mistakes in entering commands or have questions about how to accomplish a particular function or goal. Various levels of on-line help systems have been provided to assist users. A very simple level is one in which the system, in response to the entry of an erroneous command, outputs an error code or a short message. The user's response depends upon the user's knowledge which varies greatly dependent upon the user's training and experience with using computers. An experienced person usually would know the proper response, upon receiving an error message, but even experts often need help. A less experienced person would have to look up the answer in a manual or ask a more knowledgeable person what to do. Some computers are provided with on-line help systems in which full text or shortened descriptions of system commands can be accessed by a user pressing a help key. Such descriptions may or may not be helpful dependent upon the user's expertise and ability through trial-and-error methods to choose the right option. Such descriptions are general in nature and are not tailored to the specifics of the user's activity.

In the past, various "intelligent" help systems have been proposed at least some of which incorporate concepts, techniques and tools from the field of artificial intelligence.

U.S. Pat. No. 4,736,296- Katayama et al describes a "METHOD AND APPARATUS OF INTELLIGENT GUIDANCE IN NATURAL LANGUAGE" wherein a user inputs into the system a natural language description of the job to be performed. A natural language analyzer analyzes or parses the input and an inference or deduction means, in conjunction with a rule based knowledge base, analyze the output from the natural language analyzer and produce a command train for executing the job desired by the user. In contrast to the subject invention more fully described hereinafter, the invention described in such patent does not provide an explanation model nor handle erroneous system commands.

U.S. Pat. No. 4,713,775- Scott et al describes an "INTELLIGENT ASSISTANT FOR USING AND OPERATING COMPUTER SYSTEM CAPABILITIES TO SOLVE PROBLEMS" in which a program for operating a computer is automatically generated in response to a user entering information in response to solicitations from the system. The system is an application of artificial intelligence concepts in which a knowledge base interacts with a rules base to analyze the input and solve the problem by producing a program. The system also produces explanations of why the program is appropriate. Such system differs from the subject invention in that its basic function is automatic programming and not an on-line help system, the input is by interactive system questions and user response as opposed to the user entering erroneous system commands or user queries, and the output is a program along with an explanation as opposed to the output being one or more suggestions, along with dynamic generation of explanations for each suggestion as to why such suggestion was made and how it would achieve the user's goals.

U.S. Pat. No. 4,500,964-Nickle describes a "DIALOG USER ERROR DIAGNOSIS, SEVERITY, AND HELP TECHNIQUE" for a data entry system in which, in response to erroneous data entry, predetermined error messages are outputted to the user along with general suggestions on how to correct similar errors, and a diagnosis of what will happen if the errors are not corrected. The system does not provide dynamically generated suggestions for correcting erroneous system commands based on the specific content of the error, answer user questions, provide explanations of the suggestions, nor otherwise function as an intelligent help system.

U.S. Pat. No. 4,648,062-Johnson et al discloses a "METHOD FOR PROVIDING AN ON LINE HELP FACILITY FOR INTERACTIVE INFORMATION HANDLING SYSTEMS" in which, in response to a user's request for help by actuating a Help key, three levels of help are provided. The first level is a window displaying only those commands which are usable dependent upon the current stage of processing. The second level is a window explaining parameters associated with a particular command. The third level describes commands and parameters not valid for the current step but which are valid within the operator task. The information thus provided is done so within the context of the activity. The described method does not respond to user questions, to the entry of erroneous commands, and it does not provide suggestions and explanations in the manner of the subject invention.

U.S. Pat. No. 4,800,485-Ackroff et al, describes an "ON-LINE DOCUMENTATION FACILITY" in which a user can enter user defined help documentation that will supplement system provided documentation. In response to help requests, both type of documentation are provided to the requestor. Help requests are made by help commands. The system does not provide help in response to erroneous commands or questions, nor does it generate suggestions and explanations in the manner of the subject invention.

An article, LEARNING BY DOING WITH SIMULATED INTELLIGENT HELP, by J. M. Carroll and A. P. Aaronson, Communications of the ACM, September, 1988, Vol. 31, No. 9, pgs. 1064–1079, describes a simulated help system in which both how and why explanations are provided by a help system to a user in response to user errors. The explanations are either predetermined or generated by another person on-the-fly. The predetermined explanations are general for each class of error and are not tailored to the specific user's goals. The other explanations are generated or created by a person viewing a monitor that displays the user's actions and cover errors outside of the classes for predetermined explanations. No explanations are generated dynamically by the system.

SUMMARY OF THE INVENTION

There are three related aspects of the problem. First, prior art help systems do not take the context of the user's interaction with the system into account when presenting canned help information. Second the presentation format of help information does not parallel the user's view of the task. Suggestions and explanations must be presented in a format that coincides with the user's approach to accomplishing a goal. Finally, help messages are often poorly understood. It is not sufficient to provide a single suggestion for accomplishing a goal, but rather the system needs to make explicit its reasoning as to why the suggestion is offered and how a suggestion can be implemented.

What the user needs to know about a system at any given time depends mostly upon his plans and goals. Providing predefined canned text as the basis of help information for all user queries fails to satisfy user needs in accomplishing a goal. This in turn implies the ability to present the necessary information in a scheme that supports the user's view of his plan for goal achievement. In addition to a meaningful presentation format, help messages need to be able to be explained at several levels of detail. Explanations must tell the user how to interpret suggestions given as options, as well as how to implement such suggestions.

Thus, the problem to be solved is how one explanation paradigm can be used to integrate dynamically generated explanations that parallel the user's view of a task with a precise explication of the system's reasoning for why a suggestion is offered.

Accordingly, one of the objects of the invention is to provide an on-line intelligent help system that, when the user enters an incorrect command, as well as when the user asks the system for help, will provide suggestions on achieving user goals and explanations useful in aiding the user to understand the system's reasoning strategies as to why the suggestions were made.

Another object is to provide an intelligent help system that will, in response to a user entering an erroneous command or a question, provide the user with one or more suggestions on possible courses of action and, for each suggestion, an explanation of why such suggestion was made along with an explanation of how such suggestion will achieve a user goal.

A further object is to provide an on-line, interactive, intelligent help system useful for all degrees of user competence ranging from novice to expert.

Still another object is to provide an intelligent help system that, upon being invoked, will offer suggestions and dynamically generate explanations paralleling a user's view of a task.

Another object is to provide an intelligent help system that will create suggestions for achieving a user goal and explanations tailored to what the system perceives such goal to be, the suggestions and explanations being selectively viewable by the user at the user's discretion.

A still further object is to provide a single help system that allows the user to ask the system for help and allows the system to automatically decide that the user needs help, at different times.

Another object is to provide an interactive intelligent help system that establishes an explanation paradigm, based on stated or inferred goals of the user, the paradigm components being generated dynamically through system inferencing and presented using two complementary formats derived from a solution-tree trace converted into connected sentences.

Briefly, the manner in which the above and other objects of the invention are achieved is to provide a data processing system having a processor for executing programs, a memory system for storing an operating system and an intelligent help program and data, a keyboard allowing a user to enter or input commands and questions into the system and interact therewith by making selections or responses as required, and a display for outputting suggestions, explanations and other information to the user. The intelligent help program is invoked by the user entering an erroneous command or a question. The help system then analyzes the command or question, and in response thereto, allows the user to view one or more suggestions and explanations, the explanations being dynamically generated and tailored to the specific task or goal of the user.

DRAWINGS

Other objects and advantages of the invention will be apparent from the following description taken in connection with the accompanying drawings wherein.

DETAILED DESCRIPTION

Figure 1:
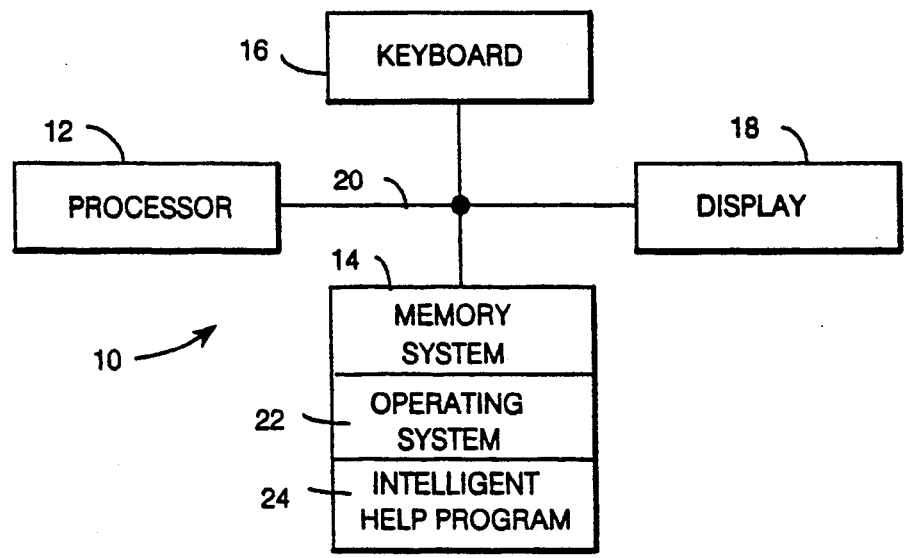
FIG. 1 is a block diagram of a data processing system embodying the invention.

Referring now to the drawings and first to FIG. 1, the invention is embodied in a data processing system including a personal computer 10 that comprises a processor 12, a memory system 14, a keyboard 16, and a display 18 all of which are interconnected by a bus system 20. Stored in memory system 14 are an operating system 22 and an intelligent help program 24. Except for program 24, all of the other elements are well known, conventional items. The personal computer 10 is preferably an IBM Personal System/2 computer provided with an OS/2 operating system 22. IBM, Personal System/2, and OS/2 are trademarks of International Business Machines Corporation. Computer 10 operates in a conventional fashion. Processor 12 executes programs that are stored in the memory system which system includes conventional devices (not shown) such as read only memory, random access memory, cache, hard disc and floppy disc as appropriate to the particular model computer being used. Keyboard 16 is used to input information from the user into the system, and display 18 outputs information from the system to the user. The combined function of the display and the keyboard is to provide an interaction between the user and the computer. The system is a command oriented system and program 24 functions to provide an on-line, interactive, intelligent help system, in the manner described in more detail hereinafter.

Figure 2:
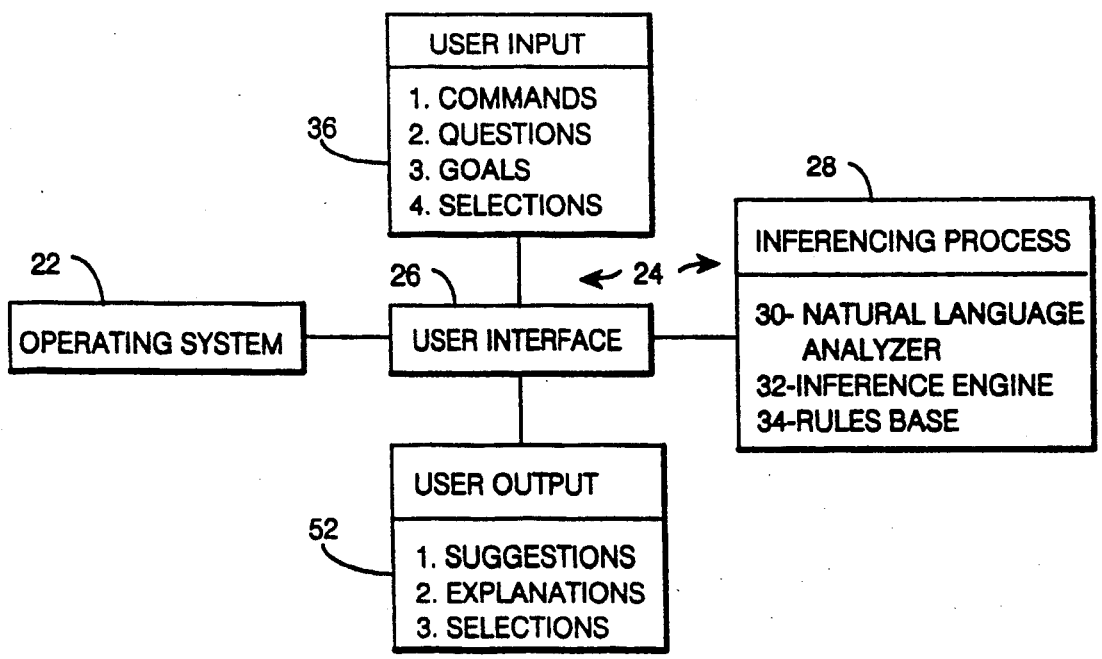
FIG. 2 is a schematic diagram generally illustrating the interaction between a user and the intelligent help system of the invention.

Referring to FIG. 2, intelligent help program 24 is divided into two major components, a user interface 26 and an inferencing process 28, to separate user interaction from problem solving. Such components are preferably setup as two separate tasks in an OS/2 environment. User input 36 is done through keyboard 16 and includes entering four different types of actions: system commands, questions, goals, and selections. Interface 26 receives such inputs and acts in the following general manner. A system command is first passed to operating system 22 and if it is a valid command, the action is executed and no action need be taken by the help system. If the command is wrong or in error, the operating system signals interface 26 and the erroneous command is passed on to the inferencing process 28 for analysis thereby. Concurrently, interface 26 informs the user of the error through a window on display 18 and affords the user the opportunity to view the results of the help system. In some instances, the user upon being informed of an error, will immediately recognize what was wrong with the command and proceed without needing any information from the help system.

Commands may be erroneous for a number of reasons, and sometimes more than one form of error may be present in a single user input. Common types of errors that may be present in association with an operating system are:

1. Errors in execution: These errors occur when the user knows the correct command to issue but does not carry it out correctly (e.g., a typographical error).

2. Errors in remembering: These errors occur when the user has forgotten all or part of the syntax of a command.

3. Errors in understanding: These errors occur when the user does not fully understand the meaning of a command, and so uses it in an invalid way.

4. Errors in preparation: These errors occur when commands are issued which look good superficially, but are invalid in the current environment (e.g., negative transference of commands across operating systems). The last situation includes errors that occur when the user has failed to make the necessary preparations so that a command will execute successfully.

The first two types of errors do not really require an artificial intelligence treatment since they could be handled by a spell checker and by an input-completing parser. However, such components are generally not widely available as parts of operating systems. Thus, it is necessary to offer assistance for such errors, along with more sophisticated help in providing for error types (3) and (4).

In designing the system, attention was given to user queries. There is rarely a direct correspondence between a precise statement or query representing a user's goal and a sequence of commands required to verify it. It is more likely that a user's query is vague, highlighting a poorly defined goal, and the goal can be accomplished in multiple ways or using a number of different sequences or commands. Thus there is some difficulty in validly mapping user queries to system answers. Queries can be categorized into procedural specification (How do I perform a certain action?), function specification (What does a command do?), Goal/subgoal specification (How can a goal be accomplished? How can a specific subgoal be accomplished within the context of a higher level goal?), and analyze a process (What is the easiest way to accomplish a goal?). To address the distinction between question types, a modified taxonomy of system responses is provided based upon the article by U. Wolz and G. E. Kaiser, "A discourse-based consultant for interactive environments", IEEE Proceedings of the Fourth Conference on Artificial Intelligence Applications (Mar. 14-18, 1988), 28-33. This is:

1. Introduce new information. Present commands and actions that are new to a user.

2. Remind. Present information about commands that the user may have forgotten.

3. Clarify alternatives. Present information about the relationships (e.g., pre and post conditions) between commands to which the user has been exposed, and show alternative commands to achieve a task.

4. Elucidate goal hierarchies. Present hierarchical information regarding relationships between goals and subgoals.

Process 28 include a natural language analyzer 30, an inference engine 32, and a rules base 34. Analyzer 30 is used to handle and parse questions inputted into the system using a natural language. Inference engine 32 and rules base 34 analyze the output of analyzer 30 and the other user inputs, to produce a user output 52 that is first stored in the system. When the user selects to receive help through viewing the output of the help system, the user output 52 is then retrieved and outputted to the user via display 18. The output includes suggestions, explanations of how and why, and selections which the system prompts the user to make. Specific examples of such items are described below.

Analyzer 30 includes a natural language parser along with a back end that transforms the parser output into goal representations 42. Rules base 34 constitutes the knowledge base of the expert system and is constructed by a knowledge engineer familiar with the data processing system and the operating system whose commands are being inputted. Base 34 includes representations of the different states of the system, of the commands and actions a user can take, and of the goals and state changes of the various commands and actions. The rules base also includes some frameworks for solutions to anticipated goals. The information is in the form of frames of four different types, a command frame, an action frame, a consequence frame, and a goal frame. A command frame has six different fields or slots:

1. A list containing the command name, its class, and two different representations of an argument list.

2. The name of the parse routine used to parse the arguments.

3. The "intents" of the command, namely, the possible user goals which the particular command accomplishes. This slot contains a list of goal expressions.

4. The preconditions of the command, i.e., those conditions that must be true before the command can be executed. This slot contains a list of disjunctions of conditions.

5. The post conditions of the command, namely, that conditions that become newly true after the command is executed. This slot is a list of conditions.

6. A property list for miscellaneous information such as whether the command handles wild cards, or is part of the operating system kernel.

Action frames are very similar to command frames except they have no associated parse routines or property lists. Action frames define the non-command actions which the user can do, such as inserting or removing diskettes, pressing certain key combinations, etc. Consequence frames are if-then rules used to interrelate goals and states, and their primary use is in cases where the user wants to effect a subset or side-effect of a more major operation. Such frames set forth the goal or state and the consequence. Goal frames define how certain goals may be divided into subgoals. Such frames lists the goal itself, what to do if any of the parameters are unbound, conditions or other relations to test, and subgoals which if achieved will guarantee that the goal will be satisfied.

Figure 3:
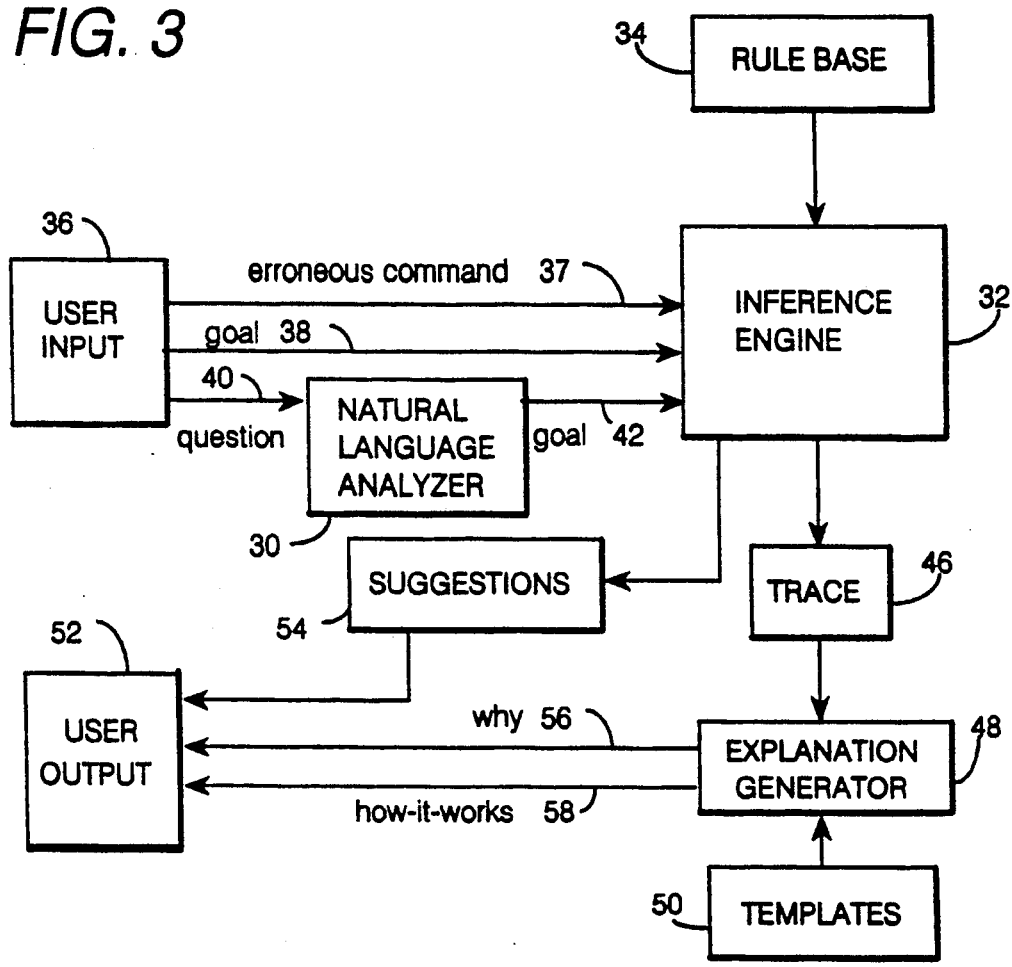
FIG. 3 is a schematic diagram useful in understanding the explanation process.

Referring to FIG. 3, user inputs 36 are passed to inference engine 32 one-at-a-time. An erroneous command 37 or a goal 38 is directly inputted into engine 32 while a question 40 is inputted into analyzer 30 which produces a goal 42 that is fed into engine 32. The goals are of various types. A "stated" goal is when a user asks a question. An "inferred" goal is when the system volunteers advice in response to an erroneous command. An "express" goal is an actual goal inputted to test the system. Inference engine 32 and rules base 34 form an expert system for analyzing the inputs and solving the problem defined thereby in accordance with general, known principles of artificial intelligence. In such system, rules base 34 is the knowledge base, and inference engine 32 is the problem solver. Together, they coact to solve the problem for a given domain. Solving the problem means either taking an incorrect command and converting it to a sequence of commands and/or actions which do what the system guesses the incorrect command is attempting to do, or taking a goal and generating a sequence of commands and/or actions which will achieve the goal. The sequence of commands and/or actions becomes what is presented to the user as a suggestion. The expert system tests the input as to it being a correct command, a command that is correct so far but is incomplete, an natural language question or command, an incorrect command, a goal expression, or a natural language question or command with spelling errors.

Inferencing process 28 acts in accordance with a set of generic rules to take a command or a goal and produce a set of subgoals. Secondary outputs of the application of a rule are commands to be recommended to the user, explanation fragments, and a set of rules to be tried further. The process bottoms out when a rule generates no subgoals. The generic rules do the following:, correct the spelling of a command, correct the spelling of arguments, correct the path, complete a command, change a command to one with similar meaning, select a command to satisfy the given command's preconditions, select a command whose intent matches the given goal, transform the given goal into a more general one, and break the goal into subgoals.

The output of engine 32 resulting from the analysis produces a trace 46 that is inputted into an explanation generator 48. The trace includes one statement for each applicable rule which statement is identified by a name and has parameters containing information on the specific user goals. The trace statements are arranged in a tree structure. Generator 48 uses trace 46 to search through templates 50 and dynamically produce or create complementary explanations 56 of why suggestions 54 were made and explanations 58 of how such suggestions work. The combination of the suggestions 54 and explanations 56 and 58 form a user output 52 that is stored in the memory system for subsequent selective output to the user in response to the user's request or selection. Templates 50 include names for all of the rule names that might appear in a trace. Each template, in addition to such name, contains one or more explanation fragments, and generator 48 combines such explanation fragments with the parameters from the trace statements and with connecting words to produce explanations in natural language, i.e., in a sentence structure that is grammatically correct in a language the user is conversant with.

Figure 4:
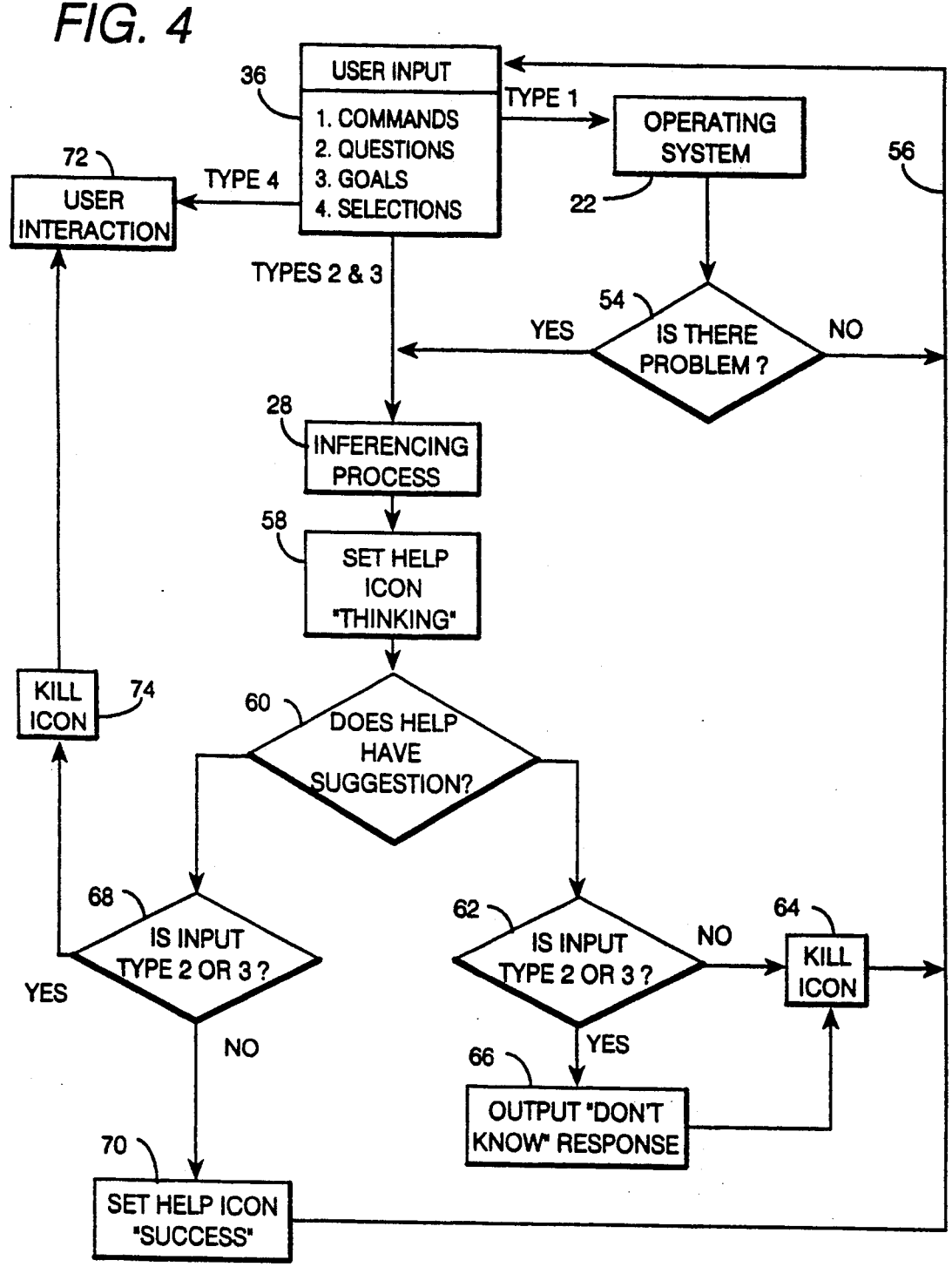
FIG. 4 is a schematic diagram useful in understanding user interaction with the system.

Referring now to FIG. 4, at the core of interaction between the user and the system is the user's input through keyboard 16, which input is, at any given time, one of four different types. Commands (type 1) are fed to the operating system 22 which determines in step 54 whether or not there is a problem with the commands, i.e., is the command incorrect or erroneous. If there is no problem, the command is successfully executed and control is transferred by flow line 56 back to the status of awaiting a new or subsequent user input. If there is a problem determined by step 54, then inferencing process 28 is started and a three state Help icon (not shown) is set to a "thinking" state by step 58 to indicate to the user that the inferencing process has begun. The icon is also settable to an "off" state, and to a "success" state which indicates to the user that the help system has a positive response.

Once process 28 has developed a response in the form of a suggestion or when the processes have completed their analysis with no suggestion or response being developed, step 60 makes such determination and branches to either step 62 or step 68 dependent on the presence or absence of a response or suggestion. If there is none, step 62 determines if the initial input was a type 2 or 3. If it was not, then step 64 simply turns the Help icon to an off state and returns control by line 56 to the user input. If the determination from step 62 was positive, which would be the case when the user input was a question or a goal and the user was expecting a response, then step 66 outputs to the user a response to the effect that the system does not know the answer. Control then passes to step 64 to kill or turn the Help icon off and then returns to the user input.

If step 60 determines there is a suggestion or response, then step 68 decides if the user input was type 2 or 3. If not, step 70 then sets the Help icon to the "success" state indicating to the user that the help assistance has a suggestion or response for the user. Control then passes to the user input. At such a point, the user has the option to view the response and look at the provided help, or the user may bypass the help and otherwise proceed such as by entering a valid command or a question. If the user wants to view the suggestion, the user then makes a selection input (type 4) and control then passes to the help interaction step 72, which allows the viewer to see the suggestion, and any explanations relative to it. If more than one suggestion or course of action is provided, the user continues with the interaction. If as a result of step 68 a positive determination was made, a branch is made to step 74 which then kills or turns the Help icon off and then step 72 is entered. Such steps are done based on the assumption that a user asking a question or inputting a goal, wants a positive response and therefore will interact with the help system to view the expected answer. It is therefore not necessary to return to the user input step 36.

As previously indicated, the knowledge or rules base is created with knowledge of the commands and actions available to the user, takes into account certain relationships between goals and states, and provides ready-made frameworks for solutions to anticipated goals. Such knowledge base would vary from system to system. The interaction of the rules base by the inferencing processes is done in accordance with known principles of artificial intelligence. Consequently, it is felt that the invention will be best understood by using three examples and explaining the operation of the system in connection therewith. Any detailed programming connected therewith is well within the skill of the art.

Example 1. Suppose that a user wants to change or switch to another directory called "MYDIR" and enters the system command "CD MYDIR". Further suppose that a directory named "MYDIR" does not exist. As a result of step 54 (FIG. 4), the system determines there is a problem and inferencing process 28 is entered to analyze the problem. The system will respond by generating two suggestions and setting the Help icon to "Success", allowing the user to selectively view the suggestions and the reasons. One suggestion is for the user to enter the command "MD MYDIR". This command when executed would cause the system to make a directory named MYDIR. The system generates a "why" explanation of, "It appears that you misspelled MD MYDIR as CD MYDIR." In generating this suggestion, the inferencing process found a rule dealing with the possibility that the command was misspelled. The system did not generate a "how" explanation since no applicable goal frame or rule was found and "how" explanations are generated only from goal rules. Note further that the specific directory name "MYDIR" is included in both the suggestion and the explanation and thus tailors each suggestion to the specific user. This is in contrast to prior art systems in which only a general description is provided, e.g., "MD <directory name>", and wherein the user would then be expected to insert the specific directory name to accomplish such a goal. Further tailoring is done by the specific sequence of explanatory remarks which sequence is specific to the user and would vary with different problems.

```
              The other suggestion is:
               .Suggestion: (1)
                    MD MYDIR
                    CD MYDIR
```

This suggestion is made by process 28 finding an applicable rule dealing with premature commands which in this specific example is interpreted to mean that before a user can issue a CD command, a MD command has to be issued to first create the directory. The system offers the following "why" explanation:

```
                Explanation: (2)
   (a) The suggestion to MD MYDIR
       is offered for the following reason(s):
   (b) You need to MD MYDIR
       in order to ensure that DIRECTORY MYDIR
       EXISTS.
   (c) You have to make sure
       DIRECTORY MYDIR EXISTS
       before you CD MYDIR.
```

The form of such explanation and how it is developed, will now be discussed. In general, commands, actions, conditions and goals (including subgoals) are emphasized by capitalizing, bold face, or italicizing, in order to facilitate the user's learning and understanding. Further, such items are parameters that are combined with explanatory fragments from applicable templates. Explanation (2) includes phrase (a) and sentences (b) and (c) derived from three different templates that respectively contain the above non-emphasized explanatory fragments. Phrase (a) discusses the specific step of the suggestion, for which step explanation (2) is offered. Phrases (b) and (c) discuss pre-condition and post-condition relationships, the condition being "DIRECTORY MYDIR EXISTS".

Example 2. The user asks the system a question by entering, "How can I prepare my floppy?". The system offers the following suggestion:

```
                Suggestion: (3)
   1. SLIDE DISKETTE IN LEFT-HAND DRIVE.
   2. FORMAT A:
```

The system offers the following "why" explanations for such steps:

```
                Explanation: (4)
   (a) The suggestion to SLIDE DISKETTE IN LEFT-HAND
       DRIVE is offered for the following reason(s):
   (b) SLIDE DISKETTE IN LEFT-HAND DRIVE is used to
       satisfy goal: INSERT DISKETTE IN DRIVE A
   (c) which is one step of achieving PREPARE
       DISKETTE A.
                Explanation: (5)
   (a) The suggestion to FORMAT A:
       is offered for the following reason(s):
   (b) FORMAT A: is used to satisfy goal:
       INITIALIZE DISK A.
   (c) which is one step of achieving PREPARE
       DISKETTE A.
         The system further offers the following "how"
              explanation for suggestion (3):
                Explanation: (6)
   (a) To PREPARE DISKETTE A:
   (b)     To INSERT DISKETTE IN DRIVE A:
   (c)         SLIDE DISKETTE IN LEFT HAND DRIVE
   (d)     To INITIALIZE DISK A, type:
   (e)         FORMAT A:
```

Note that phrases (a) of explanations (2), (4) and (5) have the same explanatory fragments, i.e., the non-emphasized portions and are derived from the same template. Similarly, sentences (b) and (c) of explanations (4) and (5) are derived respectively from the same templates. In other words, the explanations are not predetermined in the sense of using pre-canned wording or text, but such explanations are built up dynamically in accordance with the specific problems. The "how" explanation illustrates the uses of a goal rule, where, in response to analyzing the user query, the system assumes the goal is to prepare a diskette, such goal being broken down into two subgoals of first inserting a diskette and then initializing it. The indentations in the explanation (6) show such relationship and how action (c) and command (e) will accomplish the desired action. A similar format is used in explanation (8) below.

Example 3. The user enters this question, "How do I install and run program TEST from drive A to directory MYDIR on drive C?" The system responds with the following suggestion:

```
                Suggestion: (7)
   1. MD MYDIR
   2. CD MYDIR
   3. A:
   4. INSERT DISKETTE IN DRIVE A
   5. INSTALL
   6. C:
   7. TEST
        The system offers the following "how" explanation:
                Explanation: (8)
   You can use the following step(s) to INSTALL AND RUN
        PROGRAM TEST FROM DRIVE A TO
```

-continued

DIRECTORY MYDIR ON DRIVE C.
To CHANGE THE CURRENT DIRECTORY type:
   MD MYDIR
   CD MYDIR
To COPY THE PROGRAM TEST FROM A TO C:MYDIR:
   To SWITCH TO DRIVE A type:
      A:
   To ENSURE DISKETTE IN DRIVE A:
      INSERT DISKETTE IN DRIVE A
   To RUN THE INSTALL PROGRAM type:
      INSTALL
To SWITCH TO DRIVE C type:
   C:
To RUN PROGRAM C:TEST type:
   TEST For each step of such suggestion, the system creates a "why" explanation. Such explanations are selectively viewable. The "why" explanation for the first step is:

Explanation: (9)

The suggestion to MD MYDIR is offered for the following reason(s):
   You need to MD MYDIR (make directory MYDIR) to ensure that DIRECTORY MYDIR EXISTS.
   You have to make sure DIRECTORY MYDIR EXISTS, before you can CD MYDIR (change the current directory to MYDIR).
   Changing the current directory to MYDIR is one step in INSTALLING AND RUNNING PROGRAM TEST FROM DRIVE A TO DIRECTORY MYDIR ON DRIVE C.

Figure 5:
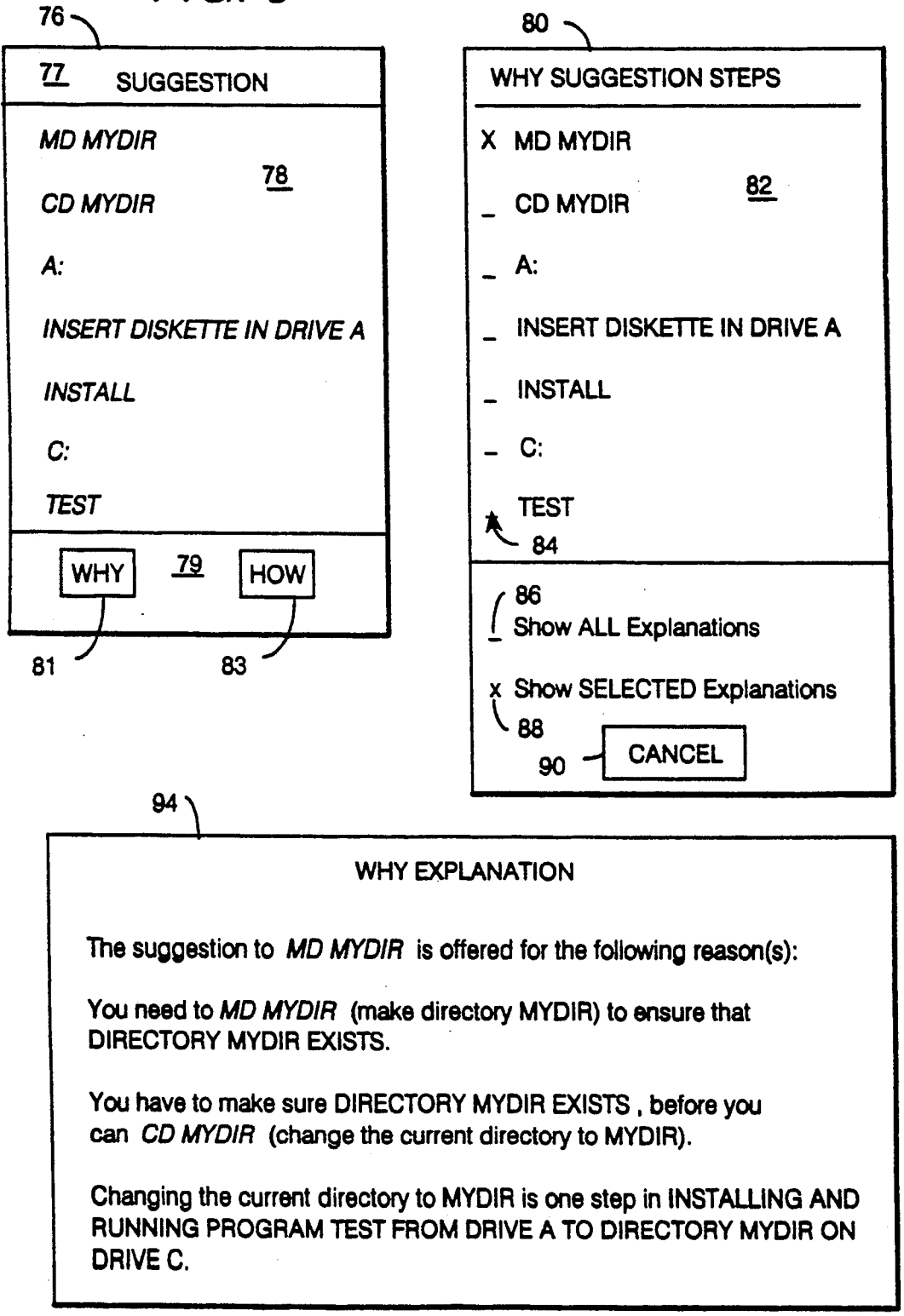
FIG. 5 is a schematic diagram of three screen windows illustrating one aspect of the invention.

It is to be appreciated that the form of the display can vary greatly and that the following description is for explanatory purposes of only one way in which the output can be presented. In general, the output on the display will be in the form of windows which may be viewed one at a time or simultaneously. Since in Example 3 the input action is a question for which a user expects a response, the system automatically outputs suggestion window 76 (FIG. 5). Such window includes a heading 77, the main body 78 in which the suggestion steps are listed, and a selection area 79 containing two buttons 81 and 83 for the user to select whether or not to view the "why" and the "how" explanations respectively. Upon selecting the "how" explanation, a window (not shown) would pop up containing explanation (8) above. Upon selecting the "why" explanation, window 80 is displayed and it contains a body 82 listing the suggestion steps along with a series of lines or buttons 84, there being one button for each suggestion step. Window 80 also displays three selection buttons 86, 88 and 90 which respectively allow the user to show why explanations for all suggestion steps, to show explanations for only those steps selected by actuating one or more buttons 84, and to cancel any further display and return to user input 36. In the illustration, the user selects to view the selected explanation for the MD MYDIR suggestion, as indicated by the X's in the drawing, and then window 94 appears, which shows the desired explanation (8) above. Windows 76 and 94 also illustrate a slightly different presentation wherein commands are differentiated or emphasized by using italics, to further promote the user's learning and understanding.

During the course of solving the problem of Example 3, a trace 46 is created which trace is listed in Table 1.

TABLE 1

| Number | Statement |
|---|---|
| 1 | INSTALL-AND-RUN(TEST,A,C,MYDIR) |
| 2 |   CHANGE(DIRECTORY MYDIR) |
| 3 |     CD MYDIR |
| 4 |   COPY-PROG(TEST,A,C,MYDIR) |
| 5 |     SWITCH-DRIVE(A) |
| 6 |       A: |
| 7 |     INSERT-DISKETTE(A) |
| 8 |       INSERT DISKETTE IN DRIVE A |
| 9 |     RUN-PROG(INSTALL,A) |
| 10 |       INSTALL |
| 11 |   SWITCH-DRIVE(C) |
| 12 |     C: |
| 13 |   RUN-PROG(TEST,C) |
| 14 |     TEST |

In Table 1, those statements with embedded parenthesis include a name, which is a goal expression, and parameters. Statements 1, 2, 4, 5, 7, 9, 11, and 13 have such form. The remaining statements either are system commands (3, 6, 10, 12, and 14) or an action (8) for the user to take. The extent of indentation identifies the nodes or levels of the tree structure. To produce a "why" explanation, the tree structure is scanned from the bottom up while a "how" explanation is scanned from the top down. During such scanning, the goal expressions or names are used to find templates of corresponding names. The system thus offers one or more suggestions, and the explanation paradigm offers two types of explanations of the steps for the suggestions. The first type focuses on how the recommended steps fit together to solve the subgoals of the problem (how it works). The second type presents the reason "why" a particular suggestion is offered by the system and provides a logical connection between each step of the suggestion and the original problem or question.

While the above description is of a help system used with the OS/2 operating system, it should be obvious to those skilled in the art that the help system is useful with other operating systems and with any application program or environment in which the user issues commands by a command line. Text editors and word processors are examples of such application programs.

It should be apparent to those skilled in the art that various changes can be made in the details and arrangement of parts and steps without departing from the scope of the invention as defined in the appended claims.

What is claimed is:

1. A method of operating a data processing system to provide an on-line, interactive intelligent help system, said data processing system comprising a memory system for storing programs and data, a processor for executing said programs, input means selectively actuated by a user to enter natural language questions into said data processing system, and output means for providing said user with visual suggestions and explanations, said method comprising the steps of:

(a) storing in said memory system a plurality of templates each one being identified by a unique name and containing one or more general explanatory phrases;

(b) storing in said memory system an expert system comprising a rules base and an inferencing process, said rules base including various rules specifying commands executable in said data processing system and what actions a user can take;

(c) translating each natural language question entered into said data processing system, into a goal expression representing what said data processing system considers to be a user goal of such question;

(d) executing said inferencing process to access said rules base and determine which ones of said rules (referred to as "applicable rules") can be used to achieve said goal expression, said inferencing process being further operable to create a suggestion and a trace of applicable rules, said suggestion including one or more steps for said user to follow and including commands and actions from said applicable rules, said trace comprising for each applicable rule a unique name and at least one parameter specific to said goal expression, (e) dynamically creating an explanation of why said suggestion is made, by searching on said unique name in said trace for a corresponding unique name in said templates and upon finding a match combining said explanatory phrases in such matching template with said parameter in such matching trace to form an explanation having grammatically correct sentences; and (f) outputting said suggestion and said explanation to said user by said output means.

2. The method of claim 1 wherein step (e) further comprises creating an explanation of how said suggestion will achieve said user goal.

3. The method of claim 1 wherein said output means is a display, and step (f) is accomplished by outputting said suggestion and said explanation on said display.

4. The method of claim 1 further comprising:
storing said suggestion and said explanation in said memory system; and
outputting to said user on said display an indication that said suggestion and said explanation are available.

5. In a data processing system comprising a memory system for storing programs and data, a processor for executing said programs, input means selectively actuated by a user to enter natural language questions into said data processing system, and output means for providing said user with visual suggestions and explanations, an improved on-line, interactive intelligent help system comprising:

(a) means for storing in said memory system a plurality of templates each one being identified by a unique name and containing one or more general explanatory phrases;

(b) means for storing in said memory system an expert system comprising a rules base and an inferencing process, said rules base including various rules specifying commands executable in said data processing system and what actions a user can take;

(c) means for translating each natural language question entered into said data processing system, into a goal expression representing what said data processing system considers to be a user goal of such question;

(d) means for executing said inferencing process to access said rules base and determine which ones of said rules (referred to as "applicable rules") can be used to achieve said goal expression, said inferencing process being further operable to create a suggestion and a trace of applicable rules, said suggestion including one or more steps for said user to follow and including commands and actions from said applicable rules, said trace comprising for each applicable rule a unique name and at least one parameter specific to said goal expression, (e) means for dynamically creating an explanation of why said suggestion is made, by searching on said unique name in said trace for a corresponding unique name in said templates and upon finding a match combining said explanatory phrases in such matching template with said parameter in such matching trace to form an explanation having grammatically correct sentences; and (f) means for outputting said suggestion and said explanation to said user by said output means.

6. The data processing system of claim 5 wherein means (e) further comprises means for creating an explanation of how said suggestion will achieve said user goal.

7. The data processing system of claim 5 wherein said output means is a display.

8. The data processing system of claim 7 further comprising:
means for storing said suggestion and said explanation in said memory system; and
means for outputting to said user on said display an indication that said suggestion and said explanation are available for viewing.

* * * * *